(12) United States Patent
Rehman et al.

(10) Patent No.: US 10,198,343 B2
(45) Date of Patent: Feb. 5, 2019

(54) METHOD FOR DEBUGGING A COMPUTER PROGRAM

(71) Applicant: Huawei Technologies Co., Ltd., Shenzhen (CN)

(72) Inventors: Irfan Ur Rehman, Bangalore (IN); Prasanna Venkatesh Ramamurthi, Bangalore (IN); Nair Sanil Kumar Divakaran, Bangalore (IN); Aman Shahi, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 15/248,713

(22) Filed: Aug. 26, 2016

(65) Prior Publication Data

US 2016/0364317 A1     Dec. 15, 2016

Related U.S. Application Data

(63) Continuation of application No. PCT/CN2014/072674, filed on Feb. 28, 2014.

(51) Int. Cl.
*G06F 11/36* (2006.01)

(52) U.S. Cl.
CPC ........ *G06F 11/366* (2013.01); *G06F 11/3664* (2013.01)

(58) Field of Classification Search
CPC ... G06F 11/0778; G06F 11/362; G06F 11/366
USPC ...................................... 714/38.11
See application file for complete search history.

(56) References Cited

U.S. PATENT DOCUMENTS

| 5,111,384 | A | 5/1992 | Aslanian et al. |
| 5,999,933 | A | 12/1999 | Mehta |
| 6,094,530 | A | 7/2000 | Brandewie |
| 6,119,247 | A | 9/2000 | House et al. |
| 6,401,216 | B1 | 6/2002 | Meth et al. |
| 6,430,707 | B1 | 8/2002 | Matthews et al. |
| 6,480,972 | B1 | 11/2002 | Cromer et al. |
| 6,681,348 | B1 * | 1/2004 | Vachon ............... G06F 11/0778 714/38.11 |
| 6,769,077 | B2 | 7/2004 | Vachon et al. |
| 7,100,006 | B2 | 8/2006 | Durrant et al. |

(Continued)

FOREIGN PATENT DOCUMENTS

| CN | 1901569 A | 1/2007 |
| CN | 102609354 A | 7/2012 |
| EP | 1215578 A2 | 6/2002 |

*Primary Examiner* — Chae M Ko
(74) *Attorney, Agent, or Firm* — Leydig, Voit & Mayer, Ltd.

(57) ABSTRACT

A debugging method is proposed in the disclosure. A computer running a program generates a master core dump file and one or more slave core dump files in response to a triggering event such as an internal failure. The core dump files are analyzed by another computer for debugging the program. The master core dump file includes an index list, and each entry of the index list corresponds to a slave core dump file of the one or more slave core dump files. The master core dump file can be the first to be transferred to the other computer. Based on the information in the index list, the other computer selectively requests one or more slave core dump files from the generated slave core dump files for debugging.

22 Claims, 8 Drawing Sheets

(56) References Cited

U.S. PATENT DOCUMENTS

| | | |
|---|---|---|
| 7,127,578 B2 | 10/2006 | Nagata |
| 7,281,163 B2 | 10/2007 | Brown et al. |
| 7,296,118 B2 | 11/2007 | Nagata |
| 7,490,268 B2 | 2/2009 | Keromytis et al. |
| 7,523,352 B2 | 4/2009 | Bradbury et al. |
| 7,861,047 B2 | 12/2010 | Nagata |
| 7,882,223 B2 | 2/2011 | Brahmavar |
| 7,930,491 B1 | 4/2011 | Xu et al. |
| 8,027,846 B2 | 9/2011 | Schoenberg et al. |
| 9,940,369 B1 * | 4/2018 | Mola .................... G06F 17/3053 |
| 2002/0078404 A1 | 6/2002 | Vachon et al. |
| 2005/0210193 A1 | 9/2005 | Nagata |
| 2006/0004840 A1 * | 1/2006 | Senda ................ G06F 17/30336 |
| 2006/0195745 A1 * | 8/2006 | Keromytis .......... G06F 11/0742 |
| | | 714/741 |
| 2007/0239944 A1 | 10/2007 | Rupanagunta et al. |
| 2008/0034178 A1 | 2/2008 | Nagata |
| 2009/0063651 A1 * | 3/2009 | Brahmavar ......... G06F 11/0709 |
| | | 709/212 |
| 2009/0282036 A1 * | 11/2009 | Fedtke ................ G06F 21/6254 |
| 2011/0246838 A1 * | 10/2011 | Huang ................ G06F 11/2236 |
| | | 714/48 |
| 2012/0203678 A1 | 8/2012 | Sutter et al. |
| 2013/0212425 A1 * | 8/2013 | Blaine ................ G06F 11/3648 |
| | | 714/6.1 |

* cited by examiner

METHOD FOR DEBUGGING A COMPUTER PROGRAM

CROSS-REFERENCE TO RELATED APPLICATIONS

This application is a continuation of International Application No. PCT/CN2014/072674, filed on Feb. 28, 2014, which is hereby incorporated by reference in its entirety.

TECHNICAL FIELD

The present application generally relates to computer technologies, and more particularly to a method for debugging a computer program.

BACKGROUND

Debugging is an important process in developing computer programs. A so-called "bug" is an error, flaw, failure, or fault in a computer program (referred to as "program" hereinafter) or system. A bug may produce an incorrect or unexpected result, or cause the program or system to behave in unintended ways. Bugs in the program can be detected and corrected through a debugging process. One way of performing the debugging is, when the program is running in a computer, to examine a region in a memory of the computer which stores information corresponding to the program. The information stored in this memory region can be retrieved, or so-called "dumped," as a file. Such a file is called a core dump file, also known as a crash dump file, a checkpoint file or a snapshot file. The core dump file corresponds to the program and/or a corresponding operating system, and reflects the execution of the program.

The debugging process may be performed by a debugger program (referred to as "debugger" hereinafter) running in the same computer as the one that runs the program. However, since the debugger consumes resources (such as memory space, bus bandwidth and processor time, etc.) of the computer, running the debugger may affect the execution of the program being debugged. For avoiding possible interferences brought by a debugger that runs in the computer concurrently with the program being debugged, debugging the program remotely from another computer becomes more desirable. This is done by providing a core dump file generated by the program-running computer (referred to as "remote computer" hereinafter) to the other computer (referred to as "host computer" hereinafter) and debugging the program by analyzing the core dump file in the host computer.

However, the overall size of a core dump file of a program can be very large, e.g. more than 100 Mega Bytes (MBs) or even over 1 Giga Bytes (GBs). Transferring the core dump file from the remote computer to the host computer may consume a lot of bandwidth, and may take a very long transfer time.

SUMMARY

Technical solutions are proposed herein through various embodiments for reducing the core dump file transferring time and/or bandwidth during a remote debugging process, and improving the efficiency of the debugging process.

In a first aspect, embodiments of the disclosure provide a method for a first computing device to debug a program running in a second computing device. The first computing device obtains a master core dump file generated by the second computing device. The master core dump file includes an index list, and each entry of the index list corresponds to a slave core dump file of one or more slave core dump files generated or to be generated by the second computing device. Each of the one or more slave core dump files includes at least one item of dumped data related to the program. The first computing device selects a first slave core dump file from the one or more slave core dump files according to information in the index list, obtains the selected first slave core dump file, and assembles the master core dump file and the first slave core dump file into an assembled core dump file. The assembled core dump file is analyzed by the first computing device for debugging the program running in the second computing device.

In a second aspect, embodiments of the disclosure provide a method for enabling a first computing device to debug a program running in a second computing device. The second computing device generates a master core dump file and one or more slave core dump files. The master core dump file includes an index list, and each entry of the index list corresponds to a slave core dump file of the one or more slave core dump files. Each of the one or more slave core dump files includes at least one item of dumped data related to the program. The second computing device then enables the first computing device to access the master core dump file. The second computing device receives a request from the first computing device for a first slave core dump file. The first slave core dump file is selected from the one or more slave core dump files according to information in the index list. The second computing device enables the first computing device to access the first slave core dump file. The master core dump file and the first slave core dump file are assembled by the first computing device into an assembled core dump file, and the assembled core dump file is analyzed by the first computing device for debugging the program running in the second computing device.

In a third aspect, embodiments of the disclosure provide a first computing device for debugging a program running in a second computing device. The first computing device includes a storage device, a communication interface and a processor coupled with the storage device and the communication interface. The storage device is configured to store instructions, the processor is configured to execute the instructions, and the communication interface is configured to communicate with the second computing device under control of the processor. The instructions, when executed by the processor, cause the processor to obtain a master core dump file generated by the second computing device. The master core dump file includes an index list, and each entry of the index list corresponds to a slave core dump file of one or more slave core dump files generated or to be generated by the second computing device. Each of the one or more slave core dump files includes at least one item of dumped data related to the program. The instructions also cause the processor to select a first slave core dump file from the one or more slave core dump files according to information in the index list, obtain the selected first slave core dump file, and assemble the master core dump file and the first slave core dump file into an assembled core dump file. The assembled core dump file is analyzed by the first computing device for debugging the program running in the second computing device.

In a fourth aspect, embodiments of the disclosure provide a second computing device. The second computing device runs a program, which is to be debugged by a first computing device. The second computing device includes a storage device, a communication interface, and a processor coupled with the storage device and the communication interface. The storage device is configured to store instructions, the processor is configured to execute the instructions, and the communication interface is configured to communicate with the first device under control of the processor. The instructions, when executed by the processor, cause the processor to generate a master core dump file and one or more slave core dump files. The master core dump file includes an index list, and each entry of the index list corresponds to a slave core dump file of the one or more slave core dump files. Each of the one or more slave core dump files includes at least one item of dumped data related to the program. The instructions also cause the processor to enable the first computing device to access the master core dump file, to receive a request from the first computing device for a first slave core dump file, where the first slave core dump file is selected from the one or more slave core dump files according to information in the index list, and to enable the first computing device to access the first slave core dump file. The master core dump file and the first slave core dump file are assembled by the first computing device into an assembled core dump file, and the assembled core dump file is analyzed by the first computing device for debugging the program running in the second computing device.

In a fifth aspect, embodiments of the disclosure provide a computer readable medium, which stores program codes for execution by a first computing device to debug a program running in a second computing device. The program codes comprise instructions for obtaining a master core dump file generated by the second computing device. The master core dump file includes an index list, and each entry of the index list corresponds to a slave core dump file of one or more slave core dump files generated or to be generated by the second computing device. Each of the one or more slave core dump files includes at least one item of dumped data related to the program. The program codes also comprises instructions for selecting a first slave core dump file from the one or more slave core dump files according to information in the index list, obtaining the selected first slave core dump file, and assembling the master core dump file and the first slave core dump file into an assembled core dump file. The assembled core dump file is analyzed by the first computing device for debugging the program running in the second computing device.

In a sixth aspect, embodiments of the disclosure provide a computer readable medium, which stores program codes for execution by a second computing device running a program to be debugged by a first computing device. The program codes comprise instructions for generating a master core dump file and one or more slave core dump files. The master core dump file includes an index list, and each entry of the index list corresponds to a slave core dump file of the one or more slave core dump files. Each of the one or more slave core dump files includes at least one item of dumped data related to the program. The program codes also comprises instructions for enabling the first computing device to access the master core dump file, receiving a request from the first computing device for a first slave core dump file, where the first slave core dump file is selected from the one or more slave core dump files according to information in the index list, and enabling the first computing device to access the first slave core dump file. The master core dump file and the first slave core dump file are assembled by the first computing device into an assembled core dump file, and the assembled core dump file is analyzed by the first computing device for debugging the program running in the second computing device.

In a seventh aspect, embodiments of the disclosure provide a first apparatus for debugging a program running in a second apparatus. The first apparatus comprises a core dump file obtaining unit and a debugging unit. The core dump file obtaining unit is configured to obtain a master core dump file generated by the second apparatus. The master core dump file includes an index list, each entry of the index list corresponds to a slave core dump file of one or more slave core dump files generated or to be generated by the second apparatus. Each of the one or more slave core dump files includes at least one item of dumped data related to the program. The core dump file obtaining unit is further configured to select a first slave core dump file from the one or more slave core dump files according to information in the index list and obtain the first slave core dump file. The debugging unit is configured to assemble the master core dump file and the first slave core dump file into an assembled core dump file, and perform a process for debugging the program running in the second apparatus by analyzing the assembled core dump file.

In an eighth aspect, embodiments of the disclosure provide a second apparatus for running a program which is debugged by a first apparatus. The second apparatus comprises a core dump file generating unit, an access enabling unit and a request receiving unit. The core dump file generating unit is configured to generate a master core dump file and one or more slave core dump files. The master core dump file includes an index list, and each entry of the index list corresponds to a slave core dump file of the one or more slave core dump files. Each of the one or more slave core dump files includes at least one item of dumped data related to the program. The access enabling unit is configured to enable the first apparatus to access the master core dump file. The request receiving unit is configured to receive a request from the first apparatus for a first slave core dump file. The first slave core dump file is selected from the one or more slave core dump files according to information in the index list. The access enabling unit is further configured to enable the first apparatus to access the first slave core dump file. The master core dump file and the first slave core dump file are assembled by the first apparatus into an assembled core dump file, and the assembled core dump file is analyzed by the first apparatus for debugging the program.

In a ninth aspect, embodiments of the disclosure provide a master core dump file used by a first computing device to debug a program running in a second computing device. The master core dump file includes a core metadata field, which stores an index list of one or more slave core dump files related to the program generated by the second computing device. Each entry of the index list corresponds to a slave core dump file of one or more slave core dump files. The first computing device selects a first slave core dump file of the one or more slave core dump files according to information in the index list of the master core dump file, and obtains the first slave core dump file. Then, the master core dump file and the first slave core dump file can be analyzed by the first computing device for debugging the program running in the second computing device.

Other systems, methods, features, and advantages will be or become apparent to one with ordinary skills in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Preferred features of the present disclosure will now be described, by way of non-limiting embodiments, with reference to the accompanying drawings, in which.

Figure 1:
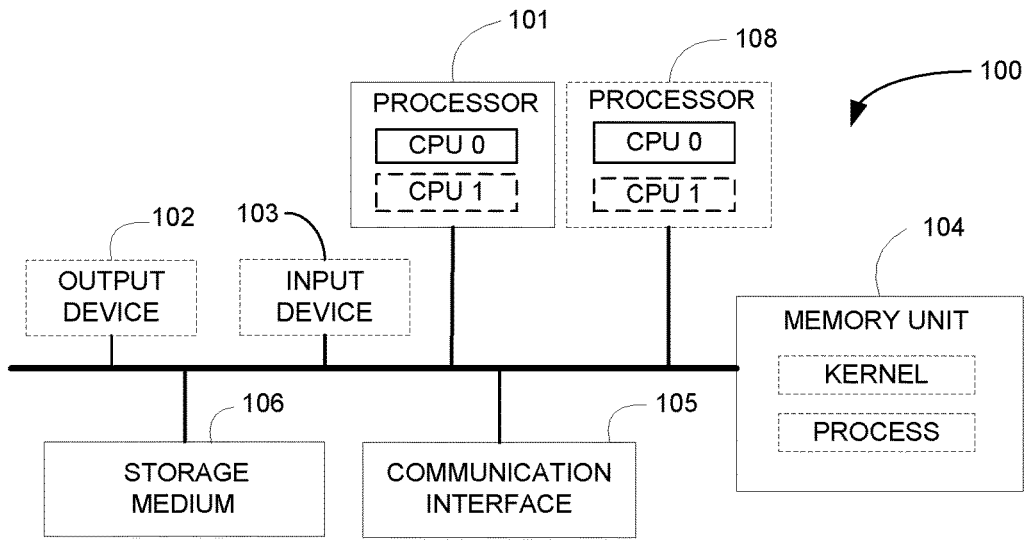
FIG. 1 is a simplified block diagram of a computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

In order to make the aforementioned objectives, technical solutions and advantages of the present application more comprehensible, a detailed description is provided below. The detailed description sets forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively by a wide range of hardware, software, firmware, or virtually any combination thereof.

FIG. 1 is a simplified block diagram of a computing device 100. The computing device 100 includes a processor 101, which is coupled with one or more data storage means. The data storage means may include a storage medium 106 and a memory unit 104. The storage medium 106 may be read-only, like a read-only memory (ROM), or readable/writeable, like a hard disk or a flash memory. The memory unit 104 may be a random access memory (RAM). The memory unit 104 may be either physically integrated with or within the processor 101 or constructed in a stand-alone unit or units.

The processor 101 is the controlling center of the computing device 100 and provides sequencing and processing facilities for executing instructions, performing interruption actions, providing timing functions and many other functions. Optionally, the processor 101 includes one or multiple central processing units (CPUs), such as CPU 0 and CPU 1 as shown in FIG. 1. Optionally, the computing device 100 includes more than one processor, e.g. processor 101 and processor 108 as shown in FIG. 1. Each of the processors 101 and 108 may be either a single-core (single-CPU) processor or a multi-core (multi-CPU) processor. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

Program codes to be executed by the processor 101 and/or 108 or by a CPU of the processor 101 and/or 108 may be stored in the memory unit 104 or the storage medium 106. Optionally, program codes stored in the storage medium 106 are copied into the memory unit 104 for the processor(s) to execute. The processor(s) may execute at least one kernel (e.g. a kernel from an operating system sold under a trademark such as LINUX™' UNIX™' WINDOWS™, ANDROID™, IOS™, etc.), which, as known, is used to control the operation of the computing device 100 by means of controlling the execution of other programs or processes, controlling communications with peripheral devices and controlling the use of computing device resources.

The computing device 100 further includes a communication interface 105 for communicating with another device or system directly or via an external network. Optionally, the computing device 100 further includes an output device 102 and an input device 103. The output device 102 is coupled with the processor 101, and capable of displaying information in one or more ways. One example of the output device 102 is a visual display device such as a liquid crystal display (LCD), a light emitting diode (LED) display, a cathode ray tube (CRT) or a projector. The input device 103 is also coupled with the processor 101, capable of receiving an input from a user of the computing device 100 in one or more ways. Examples of the input device 103 include a mouse, a keyboard, a touch screen device, a sensing device or the like.

The above elements of the computing device 100 may be coupled with each other by a bus, such as anyone or any combination of a data bus, an address bus, a control bus, an expansion bus and a local bus.

The computing device 100 can be a general-purpose computing device or an application-specific computing device. As practical examples, the above-described computing device 100 may be a desktop computer, a laptop computer, a network server, a personal digital assistant (PDA), a mobile phone, a tablet computer, a wireless terminal device, a telecommunication device, an embedded system or any other devices having similar structure as shown in FIG. 1. However, the present disclosure is certainly not limited by any particular types of the computing device.

Figure 2A:
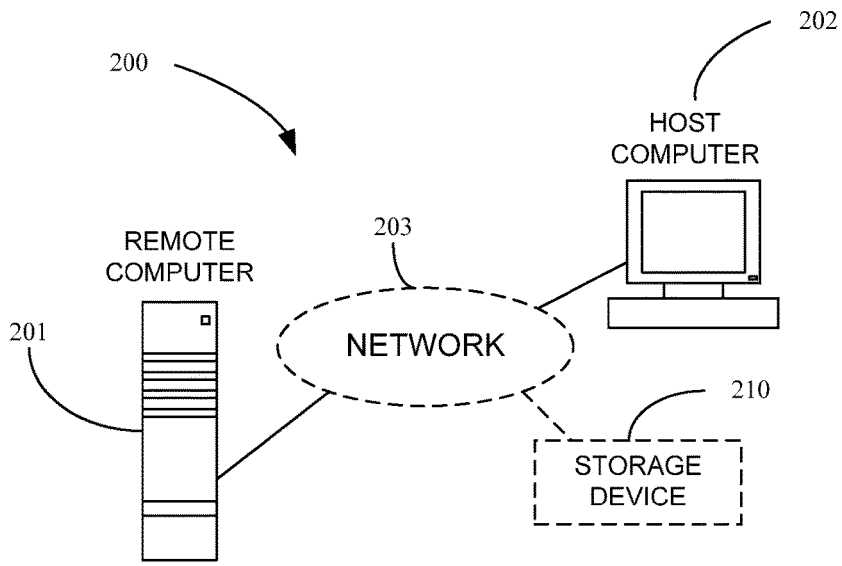
FIG. 2A is a simplified block diagram of a system on which a debugging process in accordance with an embodiment of the disclosure is implemented.

FIG. 2A depicts a debugging system 200 in accordance with an embodiment of the disclosure. The debugging system 200 includes a remote computer 201 and a host computer 202 and may further include a storage device 210. It is to be understood that the naming of the computers is for the identification purposes only, and it should not be interpreted as a limitation. The remote computer 201 stores and runs a program which is to be debugged, and the host computer 202 is configured to run a process (i.e. a debugger) which debugs the program. The remote computer 201 and the host computer 202 are equipped with communication interfaces for communicating with each other. Optionally, the communication between the two systems is conducted through a network 203. The storage device 210 may be coupled to the remote computer 201 and/or the host computer 202 directly through a communication interface, or coupled to the remote computer 201 and/or the host computer 202 through the network 203, so that one or both of the remote computer 201 and the host computer 202 have access to the storage device 210. A communication protocol used between the remote computer 201 and the host computer 202 may be RS-232C, IEEE1394, Local Area Networks (LAN), Wireless Local Area Networks (WLAN), Universal Serial BUS (USB), or any other communication protocol that is capable of providing a communication link between the remote computer 201 and the host computer 202.

The remote computer 201 and/or the host computer 202 may be realized in the form of the computing device 100 introduced above, e.g. by storing specific instructions in the memory unit 104 or the storage medium 106 and executing the instructions by the processor(s) 101 and/or 108.

Figure 2B:
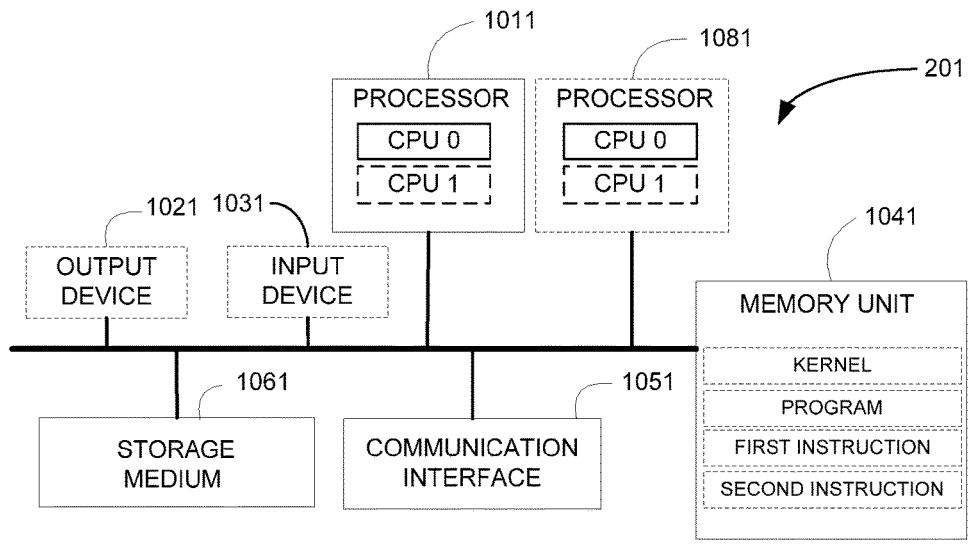
FIG. 2B is a simplified block diagram of a remote computer in which a program to be debugged is stored and executed, in accordance with an embodiment of the disclosure.

As shown in FIG. 2B, the remote computer 201 includes a processor 1011, data storage means such as a memory unit 1041 and storage medium 1061, a communication interface 1051, and optionally includes an output device 1021, an input device 1031 and an additional processor 1081. The remote computer 201 may run a program (may also be more than one programs) which is to be debugged, and, according to an embodiment of the disclosure, execute one or more instructions (first instruction, second instruction, etc. as shown in FIG. 2B) to enable the debugging of the program. The instructions may be stored in the memory unit 1041, and the instructions may be integrated in the kernel or a plug-in of the kernel of the remote computer's operating system.

By executing the first instruction, the remote computer 201 generates one or more core dump files corresponding to the program to be debugged. The generation of the core dump file(s) is be triggered by any one or any combination of the following events:

1. a software-related failure or error in running the program;
2. a hardware-related failure or error in running the program,
3. at a scheduled checkpoint,
4. following an instruction embedded in the program,
5. an input or interruption received by the input device 1031; or
6. an input or interruption received through the communication interface 1051.

In addition to the above triggering events, a set time schedule or a breakpoint for triggering the generation of the core dump file(s) may be embedded in the program to be debugged, or embedded in the kernel or the plug-in of the kernel.

The overall size of the one or more core dump files generated in response to the first instruction can be quite large, and, as the program running, the generation of the core dump files may be repeated. Therefore, before the host computer 202 starts to debug the program by analyzing the information in the core dump files, the generated core dump files need to be stored at least temporarily. In one instance, the core dump files may be stored in the local data storages means of the remote computer 201, such as storage medium 1061 or a certain partition of the memory unit 1041. In another instance, the core dump files may be stored in the network storage device 210, which is external to the remote computer 201. Various techniques for temporarily or permanently storing computer readable files are well known in the art, and they are not described in detail here.

By executing the second instruction, the remote computer 201 allows the host computer 202 to access the generated core dump files. For example, the host computer 202 may access the core dump files by receiving the core dump files transferred from the remote computer 201, or access the core dump files stored in the storage device 210 without transferring the files to the host computer 202. Techniques for one computer to access files generated by another computer are well known in the art and are not described here in detail.

Figure 2C:
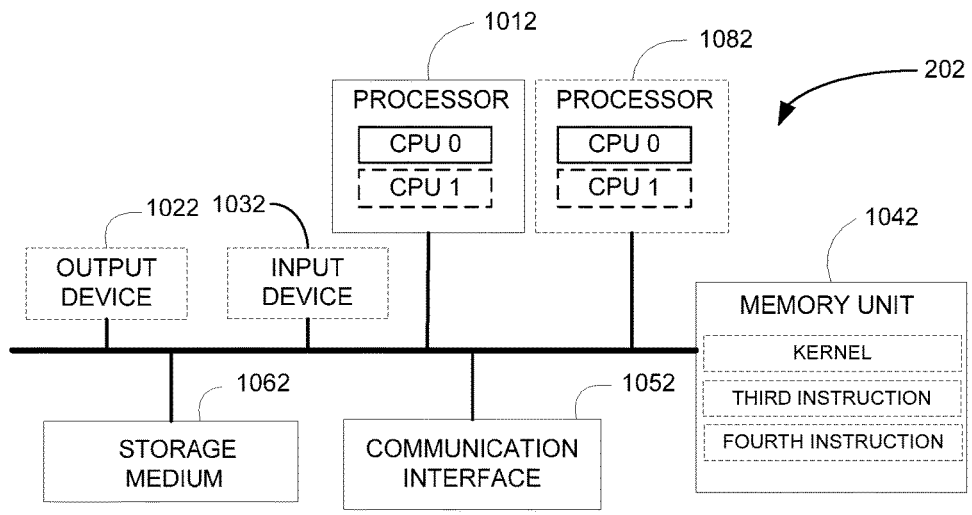
FIG. 2C is a simplified block diagram of a host computer which executes a process to debug a program stored in and executed by a remote computer, in accordance with an embodiment of the disclosure.

As shown in FIG. 2C, the host computer 202 includes a processor 1012, data storage means such as memory unit 1042 and storage medium 1062, a communication interface 1052, and optionally includes an output device 1022, an input device 1032 and an additional processor 1082. The host computer 202 may, according to an embodiment of the disclosure, execute one or more instructions (third instruction, fourth instruction, etc. as shown in FIG. 2C) for enabling debugging of a program running in the remote computer 201. The instructions may be stored in the memory unit 1042, and the instructions may be independent instructions or be integrated in a debugger or a plug-in of the debugger.

By executing the third instruction, the host computer 202 obtains the one or more core dump files generated by the remote computer 201, and assembles the obtained core dump files into an assembled core dump file in a particular manner that will be described below. The remote computer 202 may further convert or adapt the assembled core dump file into a format that is compatible with the debugger running in the host computer 202. In one instance, if the core dump files are stored in the remote computer 201, some or all of them may be transferred to the host computer 202 through the respective communication interfaces and optionally through the network 203. In another instance, if the core dump files are stored in the storage device 210, the host computer 202 obtains some or all of the core dump files by accessing the storage device 210 directly.

By executing the fourth instruction, the host computer 202 debugs the program running in the remote computer 201 by analyzing the assembled core dump file in a manner corresponding to the manner for assembling the core dump files.

Assuming that a to-be-debugged program runs in a computer and uses data storage means of the computer for dynamically storing data and other information related to the execution of the program, a core dump file is generated based on a snapshot (i.e. an instant copy) of a certain area of the data storage means during or after the execution of the program. The core dump file includes some or all of the following information:

General information: identifier, version, type, size, and address (e.g. an address in the data storage means) of the core dump file;

Debugging information: reason(s) for generating the core dump file (e.g. triggered by an internal failure, meeting a preset condition, or following an input order), time of the generation of the core dump file, name of the program to be debugged, at least one item of dumped data and information associated with the at least one item of dumped data (such as location in the core dump file, size, address, identifier and attribute of the dumped data item).

With regards to the above-described computer system 200, the "at least one item of dumped data" may be a snapshot of at least one data item in the data storage means of the remote computer 201. The address, the identifier and the attribute of the data item are respectively the address, the identifier and the attribute of the data item in the data storage means of the remote computer 201.

The at least one item of the dumped data may include at least one content of a virtual memory area (VMA). A content of the VMA includes any one or any combination of: variables related to the program, heap information (for dynamic memory allocation while the program is running), register information, memory mapping information, and call stack information (e.g. information about the active subroutines of the program), and any other data in the data storage means related to the program.

There are various ways to generate a core dump file or core dump files. In one conventional solution, a single core dump file is generated which contains all information in the storage means that is related to execution of the program, and the single core dump file is transferred to the host computer for debugging. The overall size of the single core dump file can be very large. In order to debug the program via the single core dump file, a lot of bandwidth and/or a very long time may be consumed in transferring the single core dump file from the remote computer to the host computer.

In the conventional solution, transferring the large size single core dump file to the host computer is needed. This will consume sizable system resources and may delay the debugging process. An answer to this problem is proposed in the following disclosure, in which the contents for a single core dump file are divided into a plurality of parts, and these parts are respectively stored in one master core dump file and one or more slave core dump files. An index list (or any other form equivalent to an index list), which includes information for identifying each of the one or more slave core dump files, and optionally includes information for identifying the contents in each of the one or more slave core dump files, is generated and stored in the master core dump file.

Optionally, the index list comprises one or more entries. Each of the entries contains information for identifying a slave core dump file and may contain information for identifying contents of the slave core dump file. The information for identifying a slave core dump file may include any one or any combination of an identifier and an address of the slave core dump file. The optional information for identifying contents in the slave core dump file may include any one or any combination of: an identifier or an address of an item of dumped data saved in the slave core dump file, and a mapping relationship between the slave core dump file and the item of the dumped data.

Except that the index list needs to be contained in the master core dump file, information to be contained in the master core dump file and each of the one or more slave core dump files can be predefined flexibly. The following is some examples of the contents in the master and slave core dump files. It is understood that many different arrangements can be made by persons skilled in the art without departing from the spirit of the disclosure.

In one instance, the master core dump file further includes at least one item of critical dumped data, and all or part of the following information:

General information: identifier, version, type, size, and address (e.g. an address in the data storage means) of the master core dump file;

Debugging information: reason(s) for generating the master core dump file, time of the generation of the master core dump file, name of the program to be debugged, and information associated with the at least one item of critical dumped data.

Some dumped data may be critical for the debugging. What constitutes as the critical data can be predefined. A first filter may be set for dumping the predefined critical data into the master core dump file.

The one or more slave core dump files may be constructed to include the information that is not included in the master core dump file, e.g. the dumped data items that are not in the critical data category. Optionally, if more than one slave core dump files are to be generated, information to be included in each slave core dump file can be predefined. A second filter may be used for dumping information into different slave core dump files accordingly.

In another instance, information to be dumped into the master core dump file and one or more slave core dump files may be split logically among the master core dump file and the slave core dump files. For example, the part or all of the data items of a conventional core dump file may be divided into multiple minimum units according to their categories (such as call stack, heap and bin data) for debugging. Thus, the master core dump file and the slave core dump file(s) can respectively be constructed to store one or more of the minimum units according to their categories.

Optionally, data items are dumped into slave core dump files according to a predetermined size limit for each slave core dump file. For example, if information to be dumped into slave core dump files exceeds the size limit, it may be divided into multiple parts and each part is dumped into one slave core dump file.

Format of the master core dump file and slave core dump file may be predefined. For example, a time stamp can be appended at the end of the generated master core dump file and each slave core dump file.

The master core dump file can be the first to be transferred to the host computer or to be accessed by the host computer. The host computer starts to debug the program by analyzing the master core dump file. The index list and other information in the master core dump helps the host computer to identify a problem occurred in running the program. In order to debug the program, the host computer selectively requests one or more of the generated slave core dump files according to the information in the index list. Optionally, the host computer may directly request one or more of the generated slave core dump files according to the information in the index list without further analyzing the master core dump file (if the master core dump file does not contain any dumped data item).

After processing the master core dump file to get the information therein, the host computer continues to debug the program by analyzing the information in the obtained slave core dump files. If the debugging is not satisfactory after analyzing the obtained slave core dump files, the host computer continues to selectively request one or more of the generated slave core dump files according to the information in the index list. This process is repeated until the debugging results are satisfactory or until all the slave core dump files have been analyzed.

The process of analyzing the dump files and requesting more slave core dump files can be executed at least partially in parallel. For instance, the received mater core dump file and first slave core dump file are assembled into an assembled core dump file. The host computer debugs the program by analyzing the assembled core dump file. If the assembled core dump file does not contain the information needed for debugging, a next slave core dump file is requested and added to the assembled core dump file. The host computer continues to debug the program while, at the same time, subsequent slave core dump files are requested and added to the assembled core dump file.

Normally, not all information in all the core dump files is needed for debugging. By requesting and transferring core dump files selectively and gradually as the debugging progressing, time and bandwidth for transferring the core dump files can be reduced, and debugging efficiency can be improved. Techniques for identifying and eliminating bugs in the computer program are known to persons skilled in the art and will not be explained in depth here.

Figure 3:
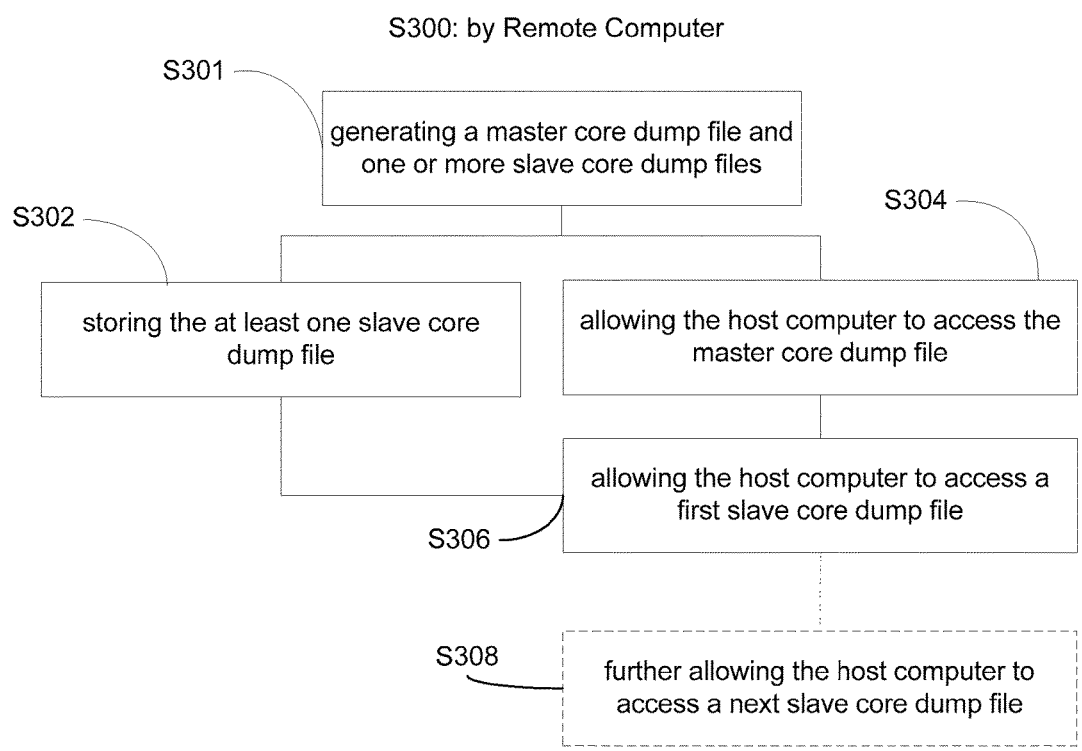
FIG. 3 is a flow chart of a process for obtaining a master core dump file and one or more slave core dump files of a program running in a remote computer, in accordance with an embodiment of the disclosure.
Figure 4:
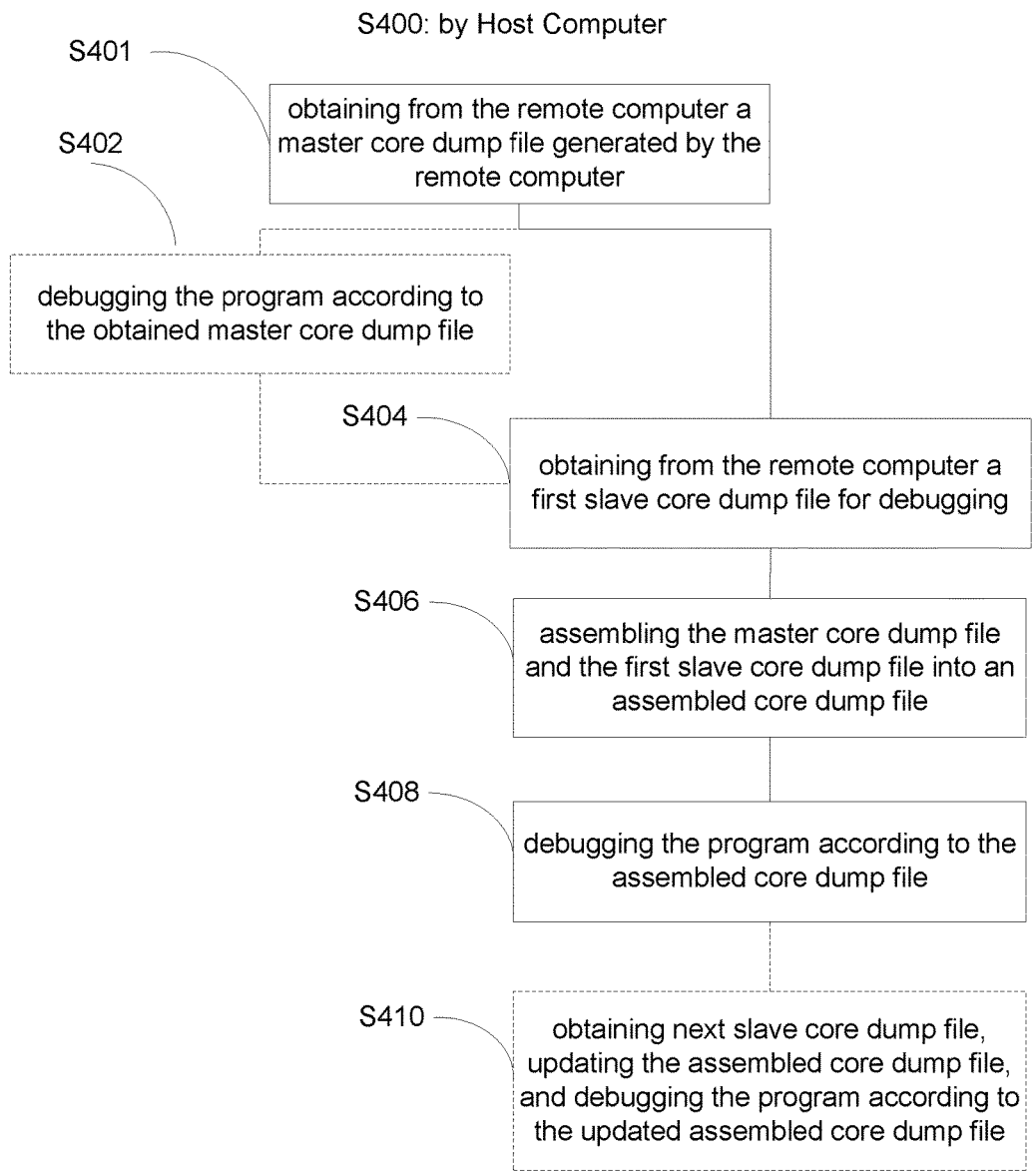
FIG. 4 is a flow chart of a process for analyzing the master core dump file and one or more salve core dump files by a host computer, in accordance with an embodiment of the disclosure.

In accordance with the above-described technical solution and as an embodiment of the disclosure, a debugging process includes steps performed by a remote computer and steps performed by a host computer, as shown, respectively in FIGS. 3 and 4.

At the remote computer side, a flow chart of a process for obtaining a master core dump file and one or more slave core dump files for debugging a program is shown in FIG. 3. Although the process described here may be implemented in the debugging system 200 as shown in FIG. 2A in which one or both of the remote computer 201 and host computer 202 takes the form of the computing device 100 shown in FIG. 1, it is by no means limited to such a system and a computing device.

As shown in FIG. 3, the process S300 includes the following:

S301: The remote computer running a to-be-debugged program (e.g. the remote computer 201 in FIG. 2A) generates a master core dump file and one or more slave core dump files. The master core dump file includes an index list. The index list includes information for identifying each slave core dump file, and optionally further includes information for identifying contents in each slave core dump file. Each entry of the index list corresponds to a slave core dump file. The one or more slave core dump files each includes at least one item of dumped data related to the program. The master core dump file may further include item or items of dumped data as well.

S302: In an ongoing process, the generated master core dump file and the one or more slave core dump files are stored locally in the remote computer or in a network storage device (e.g. the storage device 210 in FIG. 2A) as these files are generated.

When the master core dump file is generated, the remote computer may inform the host computer (e.g. the remote computer 202 in FIG. 2A) that the program is ready to be debugged. It is not necessary to wait until all data items related to the program have been dumped to start the debugging. Running the debugger and generating the slave core dump files may be performed at least partially concurrently.

S304: The remote computer allows the host computer to access the master core dump file.

In one instance, the master core dump file may be sent by the remote computer to the host computer directly through a communication link (e.g. a communication link between communication interfaces of the remote computer 201 and the host computer 202, optionally through the network 203 in FIG. 2A). The sending of the master core dump file may be in response to a request for the master core dump file from the host computer. The request for the master core dump file may include any one or any combination of the identifier and the address of the master core dump file. The identifier and the address of the master core dump file can be predefined or set in the host computer. In another instance, the master core dump file may be sent to the host computer at a scheduled time set by the remote computer. In a further instance, the master core dump file maybe fetched by the host computer from the remote computer (e.g. the host computer accesses the data storage means of the remote computer—without the assistance of the remote computer—through certain type of communication link such as IEEE 1394) or from the network storage device. Fetching core dump files from the network storage device or the data storage means of the remote computer may be very useful when the software failure or the hardware failure is severe enough to prevent the remote computer from processing the request for the master core dump file or executing instructions for sending the master core dump file at the scheduled time. Optionally, when the remote computer includes multiple processors or multiple CPUs (e.g. the processor 1011 and the processor 1081 in FIG. 2B), the processes as in S301, S302 and S304 can be executed at least partially in parallel, i.e. different processes related to S301, S302 and S304 may be executed by different CPUs simultaneously. For example, the master core dump file and the one or more slave core dump files may be generated in parallel. After the master core dump file is generated, generating the slave core dump file(s) and storing the slave core dump file(s) may be performed in parallel, thus providing the master core dump file with critical information first hand to the host computer, and the host computer starts the debugging process without delay.

S306: The remote computer allows the host computer to access a first slave core dump file for debugging.

The first slave core dump file to be accessed by the host computer may or may not be the earliest generated slave core dump file. Among the slave core dump files, which one to be accessed by the host computer may be determined by the host computer based on the information in the index list. Before transferring the first slave core dump file to the host computer, the remote computer receives a request for the first slave core dump file from the host computer. The request for the first slave core dump file may be sent from the host computer when the host computer determines that the debugging process needs further information. In one instance, when the host computer debugs the master core dump file, it determines that certain data (e.g. an item of the dumped data) is needed for debugging, and this data, according to the information in the index list of the master core dump file, is stored in a certain slave core dump file. The host computer then sends the request for the first slave core dump file to the remote computer, asking to access this certain slave core dump file. In another instance, when the host computer determines that the debugging process needs further information, the host computer may choose the first slave core dump file among generated slave core dump files randomly or according to an ascending order or a descending order in the index list. The request for the first slave core dump file may include any one or any combination of the identifier or address of the first slave core dump file. The remote computer may obtain and send the first slave core dump file according to the request.

The transferring of the first slave core dump file may also be based on a scheduled time set in the remote computer. For example, the slave core dump files may be sent in a sequence (e.g. in sequence of identities, addresses or priorities of the slave core dump files) at multiple scheduled time points. Sending of the slave core dump files by the remote computer and the debugging of the program by the host computer can be performed in parallel, thus reducing a total debugging time.

Same as with the master core dump file, the first slave core dump file may also be fetched by the host computer directly from the remote computer or from the network storage device. Fetching the slave core dump files from the remote computer or the network storage device may be particularly useful when the software failure or the hardware failure is severe enough to prevent the remote computer from processing the requests for slave core dump files or executing instructions for sending the slave core dump files at the scheduled times.

Optionally, in step S308, the remote computer further allows the host computer to access a next slave core dump file and subsequent slave core dump files for debugging.

The next slave core dump file may be transferred in response to a further request for slave core dump file from the host computer, when the host computer determines that further information is needed for debugging and the received mater core dump file and first slave core dump file, which are assembled into an assembled core dump file by the host computer, do not contain the information.

The step S308 may be repeated until all of the slave core dump files are transferred or no further request for slave core dump file is received from the host computer.

Alternatively, the transferring of the next and subsequent slave core dump files may be based on a time schedule set in the remote computer.

The execution of the steps S301 to S308 may be performed by the remote computer according to certain instructions (e.g. the first and second instructions as mentioned above with regard to FIG. 2B).

At the host computer side, a flow chart of a process for analyzing the master and slave core dump files in the host computer is shown in FIG. 4. Although the process described here may be implemented in a debugging system 200 as shown in FIG. 2A in which one or both of the remote computer 201 and host computer 202 takes the form of the computing device 100 shown in FIG. 1, it is by no means limited to such a system or computing device.

As shown in FIG. 4, the process S400 includes the following:

S401: The host computer (e.g. the host computer 202 in FIG. 2A) obtains a master core dump file generated by the remote computer (e.g. the remote computer 201 in FIG. 2A). The master core dump file includes the index list as described above. Each entry of the index list corresponds to a slave core dump file of one or more slave core dump files generated or to be generated by the second computing device.

Instances for the host computer to obtain the master core dump file have been described in the step S304 and are not repeated here.

Optionally, S402: The host computer starts to debug a program corresponding to the master core dump file by first analyzing the master core dump file. For example, when the master core dump file includes at least one item of dumped data or other debug related information, the at least one item of dumped data or other debug related information is analyzed by the host computer for debugging the program.

S404: The host computer obtains from the remote computer a first slave core dump file according to the information in the index list.

Instances of the host computer selecting and obtaining the first slave core dump file have been described in the step S306 and are not repeated here.

S406: The host computer assembles the master core dump file and the first slave core dump file into an assembled core dump file.

The assembling may include combining items of dumped data recorded in the master core dump file and the first slave core dump file, and adapting the general information of the assembled core dump file according to the combined items, for example, updating locations of the combined item of the dumped data in the assembled core dump file.

S408: The host computer starts to debug the program by analyzing the assembled core dump file.

The host computer debugs the program by running a debugger. The debugger may be any known debugging program.

The format of the assembled core dump file should be compatible with the file format supported by the debugger. If the file format of the assembled core dump file is not compatible with the file format supported by the debugger, the assembled core dump file is adapted to the format supported by the debugger in step S406. Optionally in step S410, the host computer further obtains a next slave core dump file from the remote computer, updates the current assembled core dump file by adding into it contents of the next slave core dump file, and provides the updated assembled core dump file to the debugger. The step S410 may be performed when it is determined that the debugging result based on current assembled core dump file is not satisfactory by some predefined standard (e.g. the assembled core dump file does not contains sufficient information for debugging the program running in the second computing device), and the step S410 and S408 may be executed concurrently or at least partially in parallel.

The steps S408 and S410 may be repeated until all slave core dump files generated by the remote computer are obtained, or the debugging result based on the current assembled core dump file is satisfactory by some predefined standard.

The execution of the steps S401 to S410 may be performed by the host computer according to certain instructions (e.g. the third and fourth instructions as mentioned above with regard to FIG. 2C).

By implementing the above-disclosed processes in the debugging system, transferring all of the dumped data from the remote computer to the host computer at once can be avoided, and the debugging can be started in an earlier time while the transferring of the slave core dump file is performed at least partially in parallel with the debugging. In addition, when it is determined that no further information is needed, e.g. a defect is identified according to the already transferred master core dump file and/or slave core dump files, the transferring of the rest of slave core dump files can be terminated, so as to reduce the average transferring time of the dumped data and significantly improve debugging efficiency.

Figure 5:
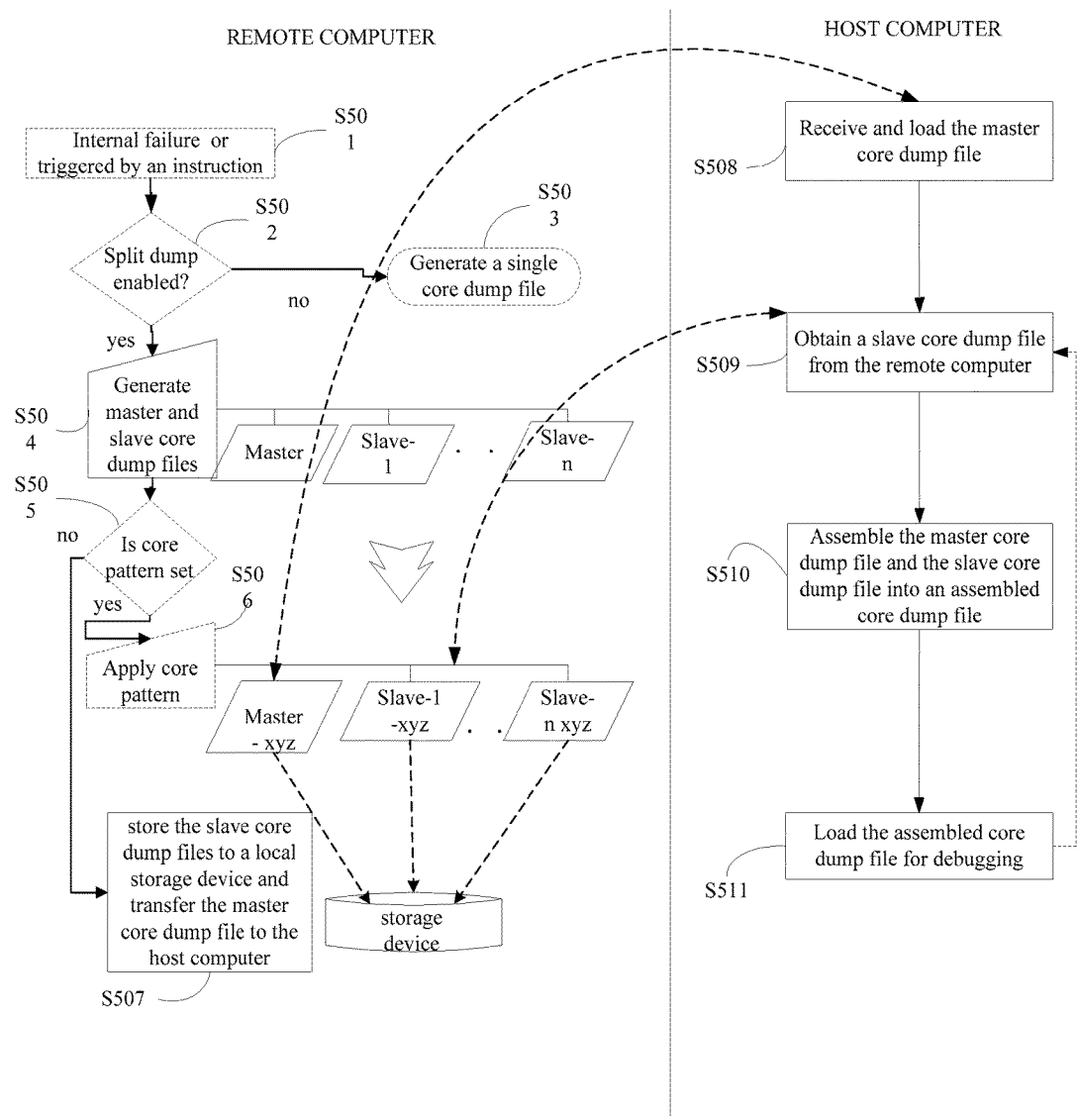
FIG. 5 is a flow diagram of a method for debugging a program in accordance with an embodiment of the disclosure.

FIG. 5 depicts an exemplary debugging process in accordance with another embodiment of the disclosure. Although the method described here may be implemented in a debugging system 200 as shown in FIG. 2A in which one or both of the remote computer 201 and host computer 202 takes the form of the computing device 100 shown in FIG. 1, it is by no means limited to such a system or computing device. It is to be understood that not all steps in FIG. 5 are required, and the steps maybe executed sequentially, concurrently, in parallel, simultaneously, and the like.

In step S501, triggered by an internal failure or error (e.g. software failure or hardware failure) in running a program, or following an internal or external instruction, a remote computer that runs the program takes a snapshot of a certain region of a memory unit. The information in the snapshot relates to the execution of the program, and is to be saved in one or more core dump files. The core dump files will be analyzed by a host computer.

In step S502, the remote computer determines whether a split dump function (i.e. a function that generates a master core dump file and at least one slave core dump file) is enabled. If the split dump function is not enabled, the remote computer goes to perform step S503; if the split dump function is enabled, the remote computer goes to perform step S504.

S503: The remote computer generates a single core dump file with the information in the snapshot. The generation of the single core dump file and subsequent processes for debugging the program are similar to that in the prior art, and is not described here.

S504: The remote computer generates a master core dump file and one or more slave core dump files with the information in the snapshot. The one or more slave core dump files each includes at least one item of dumped data related to the program to be debugged. The master core dump file includes an index list and may additionally include one or more items of dumped data and/or other debugging related information. Each entry of the index list corresponds to one slave core dump file.

S505 (Optional): the remote computer determines whether a pattern of the core dump files is set. If the pattern is set, the remote computer goes to perform step S506. If the pattern is not set, the remote computer goes to perform step S507.

S506 (Optional): The remote computer applies the pattern to each of the master and slave core dump files. For example, a time stamp (e.g. hh:mm:ss) may be appended at the end of generated master and slave core dump files according to the pattern. After applying the pattern, the remote computer may go to perform step S507.

S507: The remote computer enables the host computer to access the generated master and slave core dump files. This can be done in various ways. For example, the remote computer may store the one or more slave core dump file temporarily in a storage device (e.g. in a local storage device or a network storage device coupled to the remote computer), and transfer the master core dump file to the host computer.

The generating and transferring of the master core dump file may be performed at least partially in parallel with the generating and storing of the one or more slave core dump files.

S508: The host computer, which runs a debugger and is enabled to access the master and slave core dump files generated by the remote computer, retrieves and loads the master core dump file.

The instances of how the host computer obtains the master core dump file have been described in the step S304 above and will not be repeated here.

S509: After loading the master core dump file, the host computer identifies and obtains a slave core dump file from the one or more slave core dump files according to information in the index list.

The instances of how the host computer obtains the first slave core dump file have been described in the step S306 and will not be repeated here.

The step S509 may be repeated for a next slave core dump file or files, if the host computer determines that certain information needed for debugging is not stored in the previously obtained core dump file(s).

S510: After the step S509, the host computer assembles the master core dump file and the obtained slave core dump file(s) into an assembled core dump file.

S511: The host computer loads the assembled core dump file for debugging. Optionally, when the host computer determines certain information that is needed for debugging is not stored in the assembled core dump file, the host computer may go back to perform step S509 for obtaining another slave core dump file.

The steps S508 to S511 may be performed at least partially in parallel with the steps of generating and storing the slave core dump files (S504-S507), and the step S509 may be performed at least partially in parallel with the steps of assembling and debugging (steps S510 and S511), thus saving a total debugging time.

Figure 6:
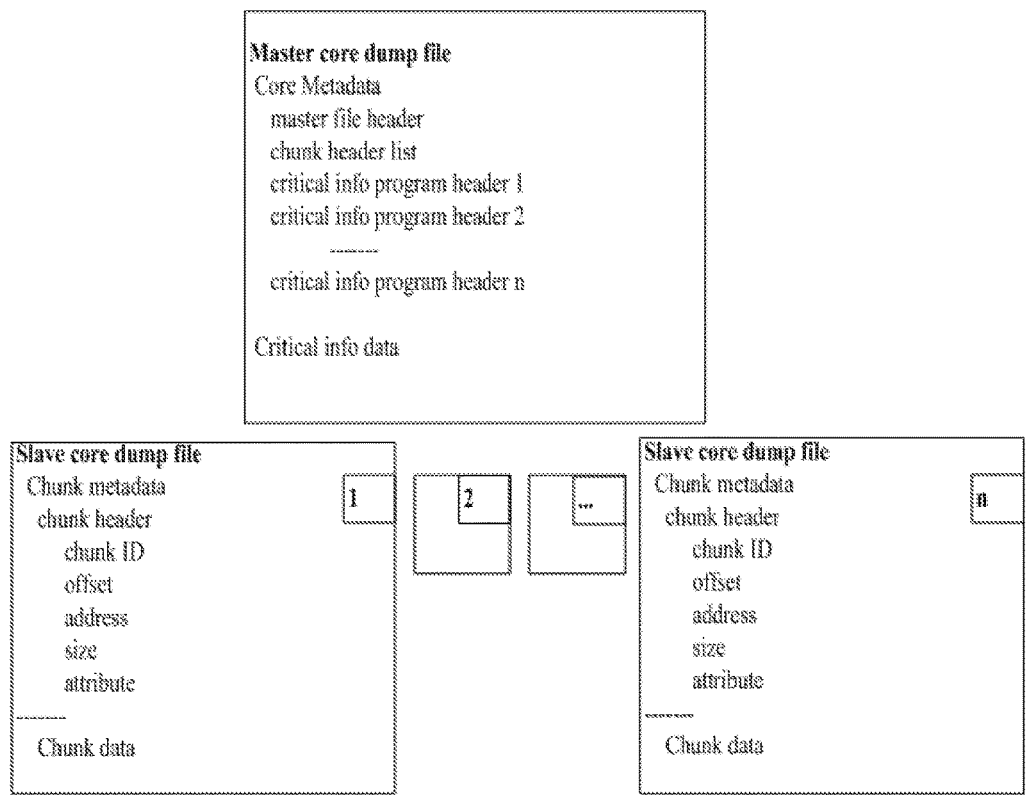
FIG. 6 is a schematic illustration of a master core dump file and one or more slave core dump files in accordance with an embodiment of the disclosure.

FIG. 6 depicts an exemplary master core dump file and slave core dump files (slave core dump files 1 to n). The master core dump file includes a core metadata field and optionally a critical info data field. The core metadata field is used to store information corresponding to part or all of the general information and part of the debugging information mentioned above. For example, the core metadata field may include any one or any combination of: general information of the master core dump file and the slave core dump files, an identifier and an address of at least one item of dumped data stored in the critical info data field, and a chunk header list of the slave core dump files (corresponding to the index list mentioned above). The critical info data field is used to store the at least one item of the dumped data related to the program to be debugged. The at least one item of the dumped data may be a content of a virtual memory area (VMA). This content may be, for example, any one or any combination of: variables related to the program, heap information, register information, memory mapping information, and call stack information, or may be any other data in a memory unit related to the program.

The core metadata field may include a master file header, a chunk header list and at least one critical info program header (e.g. critical info program headers 1 to n).

The master file header may store general information about the whole set of the core dump files, i.e. the master core dump file and the one or more slave core dump files. The general information may include any one or any combination of followings: an identifier, a version, a type, size, and an address related to the master core dump file and/or the slave core dump files, a title of the program to be debugged, and a reason and time of the generation of the master core dump file. The master file header may have a similar format as an Executable and Linkable Format (ELF) header.

The chunk header list may include a list of chunk headers of the slave core dump files with fields same as those in the slave core dump files. The chunk header list may be used as the index list of the at least one slave core dump file for mapping a slave core dump file. For example, the host computer may use the chunk header list to determine which item of dumped data and/or of what type is held by a slave core dump file.

The critical info program header may include any one or any combination of: a location (e.g. an offset) of an item of dumped data stored in the master core dump file, a size, an address (e.g. a physical address of a memory or a virtual address of a VMA), an identifier and an attribute of the first item of the dumped data. Optionally, the first item of the dumped data is a snapshot of a first data in a memory unit (e.g. RAM) of the remote computer. The address, the identifier and the attribute of the first item of the dumped data are respectively the address, the identifier and the attribute of the first data in the memory of the remote computer.

Also as shown in FIG. 6, the slave core dump file includes a chunk metadata field and a chunk data field. The chunk metadata field is used to store information corresponding to part or all of the general information and part of the debugging information mentioned above, for example, any one or any combination of: general information of the slave core dump file, an identifier and an address of at least one item of dumped data stored in the chunk data field. The chunk data field is used to store the at least one item of dumped data related to the program to be debugged, for example at least one content of a virtual memory area (VMA).

The chunk metadata field may include a chunk header. The chunk header may include any one or any combination of: an identifier of the slave core dump file (e.g. a chunk identifier (ID)), a location of the stored at least one item of the dumped data in the slave core dump file (e.g. an offset), an address (e.g. a VMA virtual address), a size, and an attribute (e.g. flags which hold information about a VMA, such as an access right of the VMA in a memory and a VMA mapping type, etc.) of the at least one item of the dumped data. Optionally, the at least one item of the dumped data is a snapshot of a first data in a memory unit (e.g. RAM) of the remote computer. The address, the identifier and the attribute of the at least one item of the dumped data are respectively the address, the identifier and the attribute of the first data in the memory of the remote computer.

Although this embodiment discloses a master core dump file and a slave core dump file structures applied to an operating system sold under the trademark such as LINUX™, UNIX™, persons skilled in the art may adapt the structure to other operating systems without departing from the scope of present application.

Figure 7:
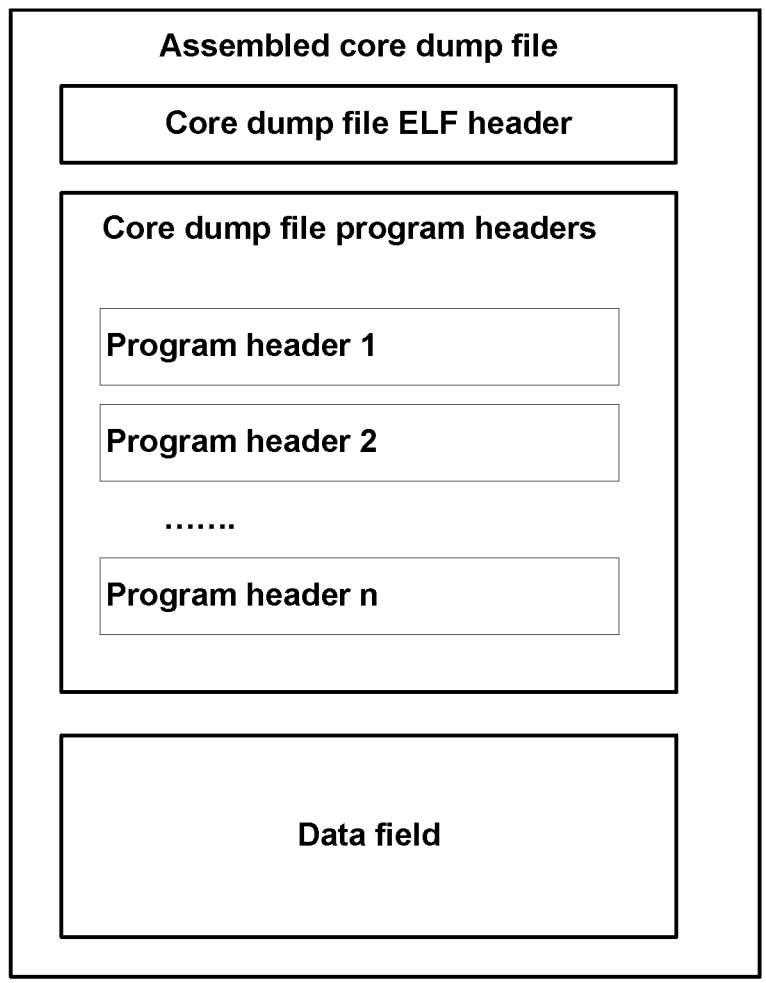
FIG. 7 is a schematic illustration of an exemplary assembled core dump file in accordance with an embodiment of the disclosure.

FIG. 7 depicts an assembled core dump file based on a master core dump file and one or more slave core dump files, following the data structure shown in FIG. 6.

As shown in FIG. 7, the assembled core dump file includes a core dump file ELF header, one or more core dump file program header (e.g. program headers 1 to n), and a data field.

The core dump file ELF header may store general information of the assembled core dump file. The general information may include any one or any combination of followings: an identifier, a version, a type, size, and an address related to the assembled core dump file. The information in the core dump field may be added from the core metadata field in the master core dump file and the chunk metadata in the slave core dump file during the assembling.

A core dump file program header may include a location (e.g. an offset) of an item of dumped data stored in the master core dump file, a size, an address (e.g. a physical address of a memory or a virtual address of a VMA), an identifier and an attribute of an item of the dumped data stored in the data field. The information in the core dump file program header may be added from the critical info program header in the master core dump file and the chunk header in the slave core dump file during the assembling.

The data field is used for storing at least one item of dumped data related to the program to be debugged. The at least one item of data in the data field may be added from the critical info data field in the master core dump file and the chunk data field in the slave core dump file during the assembling.

Optionally, during the assembling, information from the master core dump file and the slave core dump file may be adapted for the assembled core dump file. For example, the original offset of the item of dumped data originated from a master core dump file or a slave core dump file may be changed according to a new location of the item of dumped data in the assembled core dump file.

The technical solution of the present disclosure may also be realized in a debugging system which is described here in yet another embodiment. The debugging system includes an apparatus 800 as shown in FIG. 8 and an apparatus 900 as shown in FIG. 9.

Figure 8:
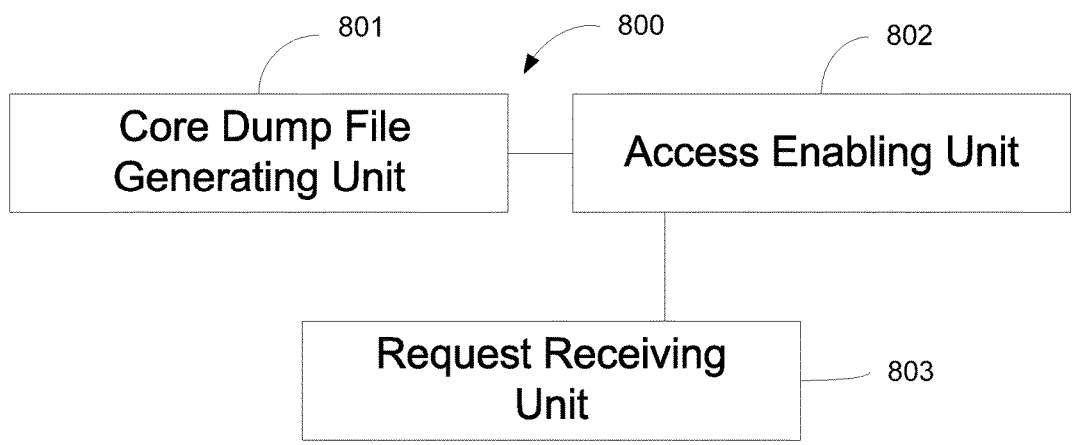
FIG. 8 is a simplified functional block diagram of an apparatus for generating and providing core dump files corresponding to a program in accordance with an embodiment of the disclosure.
Figure 9:
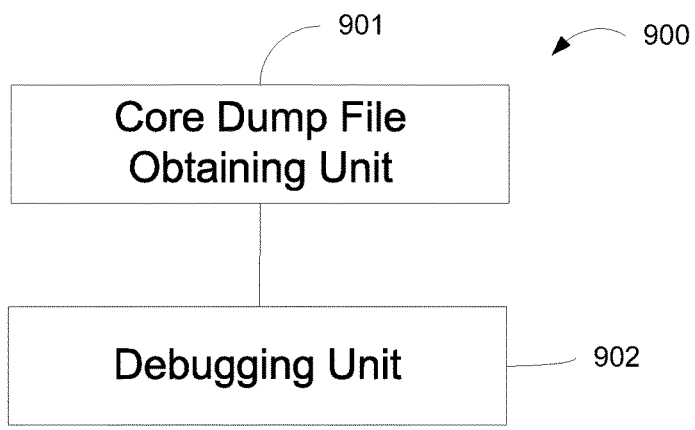
FIG. 9 is a simplified functional block diagram of an apparatus for debugging a program running in a remote computer in accordance with an embodiment of the disclosure.

FIG. 8 is a simplified functional block diagram of the apparatus 800 for running a program and generating core dump files related to the program. The program is to be debugged.

The apparatus 800 includes a core dump file generating unit 801, an access enabling unit 802 and a request receiving unit 803.

The core dump file generating unit 801 is configured to generate a master core dump file and one or more slave core dump files, wherein the master core dump file includes an index list, and each entry of the index list corresponds to a slave core dump file of the one or more slave core dump files. Each of the one or more slave core dump files includes at least one item of dumped data related to the program. The generation of the master and slave core dump files may be triggered by an event, such as a software-related failure or error in running the program, a hardware-related failure or error in running the program, at a scheduled checkpoint, following an instruction embedded in the program, a received input or interruption, etc.

The access enabling unit 802 is configured to enable another apparatus, such as the apparatus 900, to access the master core dump file.

The request receiving unit 803 is configured to receive a request from the other apparatus (e.g. a host computing device in above embodiments) for a first slave core dump file, wherein the first slave core dump file is selected from the one or more slave core dump files according to information in the index list.

The access enabling unit 802 is further configured to enable the other apparatus to access the first slave core dump file. The master core dump file and the first slave core dump file are assembled by the other apparatus into an assembled core dump file, and the assembled core dump file is analyzed by the other apparatus for debugging the program.

Optionally, the master core dump file further comprises any one or any combination of: an identifier, a version, a type, a size, and an address of the master core dump file, a first item of the at least one item of dumped data, and a location in the master core dump file, a size, an address, an identifier and an attribute of the first item of the dumped data.

Optionally, the first item of the dumped data comprises any one or any combination of: call stack information, heap information, and register information related to the program.

Optionally, the first slave core dump file stores a second item of the dumped data related to the program which is different from the first item of the dumped data.

Optionally, a first entry corresponding to the first slave core dump file in the index list comprises: any one or any combination of an identifier and an address of the first slave core dump file, any one or any combination of an identifier and an address of the second item of the dumped data, and a mapping relationship between the first slave core dump file and the second item of the dumped data.

Optionally, the request comprises any one or any combination of the identifier and the address of the first slave core dump file.

It is noted that the apparatus 800 is presented here in forms of functional units. As used herein and without limitation, the term "unit" may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality. In a very specific example, persons skilled in the art would appreciate that the apparatus 800 may take the form of the remote computer 201 of FIG. 2B. The core dump file generating unit 801 can be realized by the processor 1011 and the memory unit 1041, specifically by the processor 1001 executing the first instruction in the memory unit 1041 to generate the master core dump file and the one or more slave core dump files related to the program to be debugged. The access enabling unit 802 and the request receiving unit 803 can be realized by the processor 1011, memory unit 1041 and the communication interface 1051, specifically by the processor 1011 executing the second instruction in the memory unit 1041 to enable the communication interface 1051 to transfer the master core dump file and the one or more slave core dump files, and to receive one or more requests from the host computing device.

FIG. 9 is a simplified block diagram of an apparatus 900 for debugging a program running in a remote computing device.

The apparatus 900 includes a core dump file obtaining unit 901 and a debugging unit 902.

The core dump file obtaining unit 901 is configured to obtain a master core dump file generated by another apparatus, such as the apparatus 800 or the remote computing device in above embodiments. The master core dump file includes an index list, and each entry of the index list corresponds to a slave core dump file of one or more slave core dump files generated or to be generated by the other apparatus. Each of the one or more slave core dump files includes at least one item of dumped data related to the program.

The core dump file obtaining unit 901 is further configured to select a first slave core dump file from the one or more slave core dump files according to information in the index list and obtain the slave core dump file.

The debugging unit 902 is configured to assemble the master core dump file and the first slave core dump file into an assembled core dump file, and perform a debugging process for the program running in the other apparatus by analyzing the assembled core dump file.

Optionally, the master core dump file further comprises any one or any combination of: an identifier, a version, a type, a size, and an address of the master core dump file, a first item of the at least one item of dumped data, and a location in the master core dump file, a size, an address, an identifier and an attribute of the first item of the dumped data.

Optionally, the first item of the dumped data comprises any one or any combination of: call stack information, heap information, and register information related to the program.

Optionally, the first slave core dump file stores a second item of the dumped data related to the program which is different from the first item of the dumped data.

Optionally, a first entry corresponding to the first slave core dump file in the index list comprises: any one or any combination of an identifier and an address of the first slave core dump file, any one or any combination of an identifier and an address of the second item of the dumped data, and a mapping relationship between the first slave core dump file and the second item of the dumped data.

Optionally, the debugging unit 902 is further configured to perform an initial debugging process for the program running in the remote computing device by analyzing the master core dump file, before selecting the first slave core dump file.

Optionally, the core dump file obtaining unit 901 selecting the first slave core dump file according to information in the index list and obtain the first slave core dump file comprises: determining whether the second item of the dumped data is needed for debugging according to a result of the initial debugging process (e.g. the result of the initial debugging process indicates that the master core dump file does not contain sufficient information for debugging the program), determining any one or any combination of the identifier and the address of the first slave core dump file from the index list according to the mapping relationship between the first slave core dump file and the second item of the dumped data and any one or any combination of the identifier and the address of the second item of the dumped data, and obtaining the first slave core dump file according to any one or any combination of the identifier and the address of the first slave core dump file.

Optionally, the core dump file obtaining unit 901 obtaining the first slave core dump file according to any one or any combination of the identifier and the address of the first slave core dump file comprises: sending to the other apparatus a first request with any one or any combination of the identifier and the address of the first slave core dump file, and receiving from the other apparatus, the first slave core dump file in response to the first request.

Optionally, the core dump file obtaining unit 901 obtaining the first slave core dump file according to any one or any combination of the identifier and the address of the first slave core dump file comprises: accessing a storage device of or coupled to the other apparatus, and obtain the first slave core dump file from the storage device according to any one or any combination of the identifier and the address of the first slave core dump file.

Optionally, the debugging unit 902 assembling the master core dump file and the first slave core dump file into an assembled core dump file comprises: combining the first item of the dumped data and the second item of the dumped data, and update locations of the combined first item of the dumped data and the second item of the dumped data in the assembled core dump file.

It is noted that the apparatus 900 is presented here in forms of functional units. As used herein and without limitation, the term "unit" may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality. In a very specific example, persons skilled in the art would appreciate that the apparatus 900 may take the form of the host computer 202 of FIG. 2C. The core dump file obtaining unit 901 can be realized by the processor 1012, the memory unit 1042 and the communication interface 1052, specifically by the processor 1002 executing the third instruction in the memory unit 1042 to obtain the master core dump file and the at least one slave core dump file through the communication interface 1052 from the remote computer. The debugging unit 902 can be realized by the processor 1012 and the memory unit 1042, specifically by the processor 1012 executing the fourth instruction in the memory unit 1042 to perform the debugging and assembling.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

Persons of ordinary skill in the art should understand that all or part of the subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Finally, it should be understood that the above embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application and covered in the claims of the present application.

What is claimed is:

1. A method for a first computing device to debug a program running in a second computing device, comprising:

obtaining, by the first computing device, a master core dump file generated by the second computing device, wherein the master core dump file comprises an index list, each entry of the index list corresponds to a slave core dump file of one or more slave core dump files generated or to be generated by the second computing device, and wherein each of the one or more slave core dump files includes at least one item of dumped data related to the program;

selecting, by the first computing device, a first slave core dump file from the one or more slave core dump files according to information in the index list;

obtaining, by the first computing device, the selected first slave core dump file;

assembling, by the first computing device, the master core dump file and the first slave core dump file into an assembled core dump file, wherein the assembled core dump file is analyzed by the first computing device for debugging the program running in the second computing device, determining, by the first computing device, whether the assembled core dump file contains sufficient information for debugging the program running in the second computing device;

when the assembled core dump file is determined to not contain sufficient information for debugging the program running in the second computing device, selecting, by the first computing device, a second slave core dump file from the one or more slave core dump files according to information in the index list and obtaining the selected second slave core dump file; and updating, by the first computing device, the assembled core dump file to include information in the second slave core dump file, wherein the updated assembled core dump file is analyzed by the first computing device for debugging the program running in the second computing device.

2. The method according to claim 1, further comprising: repeating the process of: determining whether the updated assembled core dump file contains sufficient information for debugging the program, obtaining subsequent slave core dump files when the updated assembled core dump file is determined to not contain sufficient information for debugging the program, updating the assembled core dump file for debugging, until sufficient information for debugging the program has been obtained or until all slave core dump files generated by the second computing device are obtained.

3. The method according to claim 1, wherein the master core dump file further comprises a first item of the dumped data.

4. The method according to claim 3, further comprising: performing, by the first computing device, an initial debugging process for debugging the program running in the second computing device by analyzing the master core dump file.

5. The method according to claim 4, wherein the first slave core dump file stores a second item of the dumped data which is different from the first item of the dumped data in the master core dump file.

6. The method according to claim 1, wherein an entry in the index list corresponding to the first slave core dump file comprises: at least one of an identifier and an address of the first slave core dump file, at least one of an identifier and an address of an item of the dumped data, and a mapping relationship between the first slave core dump file and the item of the dumped data.

7. A method for enabling a first computing device to debug a program running in a second computing device, comprising:

generating, by the second computing device, a master core dump file and one or more slave core dump files, wherein the master core dump file comprises an index list, each entry of the index list corresponds to a slave core dump file of the one or more slave core dump files, and wherein each of the one or more slave core dump files comprises at least one item of dumped data related to the program;

enabling, by the second computing device, the first computing device to access the master core dump file;

receiving, by the second computing device, a request from the first computing device for a first slave core dump file, wherein the first slave core dump file is selected from the one or more slave core dump files according to information in the index list; and enabling, by the second computing device, the first computing device to access the first slave core dump file, wherein the master core dump file and the first slave core dump file are assembled by the first computing device into an assembled core dump file, and the assembled core dump file is analyzed by the first computing device for debugging the program running in the second computing device, receiving, by the second computing device, a second request from the first computing device for a second slave core dump file when the assembled core dump file is determined by the first computing device to not contain sufficient information for debugging the program running in the second computing device; and enabling, by the second computing device, the first computing device to access the second slave core dump file, wherein, the assembled core dump file and information in the second slave core dump file are assembled by the first computing device into an updated assembled core dump file, and the updated assembled core dump file is analyzed by the first computing device for debugging the program running in the second computing device.

8. The method of claim 7, wherein generating the master core dump file and one or more slave core dump files is triggered by at least one of the following events:

a software-related failure or error in running the program;
a hardware-related failure or error in running the program;
a scheduled checkpoint event;
following an instruction embedded in the program; and
an input or interruption received by the second computing device.

9. The method according to claim 7, wherein the master core dump file further comprises a first item of the dumped data.

10. The method according to claim 9, wherein the first slave core dump file stores a second item of the dumped data which is different from the first item of the dumped data in the master core dump file.

11. The method according to claim 7, wherein an entry in the index list corresponding to the first slave core dump file comprises: at least one of an identifier and an address of the first slave core dump file, at least one of an identifier and an address of an item of the dumped data, and a mapping relationship between the first slave core dump file and the item of the dumped data.

12. The method according to claim 11, wherein the request comprises at least one of the identifier and the address of the first slave core dump file.

13. A first computing device for debugging a program running in a second computing device, the first computing device comprising:

a storage device storing computer executable program codes;
a communication interface; and
a processor, coupled with the storage device and the communication interface;

wherein the program codes comprise instructions which, when executed by the processor, cause the processor to:

obtain a master core dump file generated by the second computing device through the communication interface, wherein the master core dump file comprises an index list, each entry of the index list corresponds to a slave core dump file of one or more slave core dump files generated or to be generated by the second computing device, and wherein each of the one or more slave core dump files includes at least one item of dumped data related to the program;

select a first slave core dump file from the one or more slave core dump files according to information in the index list;

obtain the selected first slave core dump file through the communication interface;

assemble the master core dump file and the first slave core dump file into an assembled core dump file, wherein the assembled core dump file is analyzed by the first computing device for debugging the program running in the second computing device, determine whether the assembled core dump file contains sufficient information for debugging the program running in the second computing device;

when the assembled core dump file is determined to not contain sufficient information for debugging the program running in the second computing device, select a second slave core dump file from the one or more slave core dump files according to information in the index list and obtain the selected second slave core dump file; and update the assembled core dump file to include information in the second slave core dump file, wherein the updated assembled core dump file is analyzed by the first computing device for debugging the program running in the second computing device.

14. The first computing device according to claim 13, wherein the program codes further comprise instructions which, when executed by the processor, cause the processor to:

repeat the process of: determining whether the updated assembled core dump file contains sufficient information for debugging the program, obtaining subsequent slave core dump files when the updated assembled core dump file is determined to not contain sufficient information for debugging the program, and updating the assembled core dump file for debugging, until sufficient information for debugging the program has been obtained or until all slave core dump files generated by the second computing device are obtained.

15. A second computing device for running a program to be debugged by a first computing device, the second computing device comprising:

a storage device storing computer executable program codes;
a communication interface; and
a processor, coupled with the storage device and the communication interface;

wherein the program codes comprise instructions which, when executed by the processor, cause the processor to:
generate a master core dump file and one or more slave core dump files, wherein the master core dump file comprises an index list, each entry of the index list corresponds to a slave core dump file of the one or more slave core dump files, and wherein each of the one or more slave core dump files comprises at least one item of dumped data related to the program,
enable the first computing device to access the master core dump file through the communication interface,
receive a request from the first computing device for a first slave core dump file, wherein the first slave core dump file is selected from the one or more slave core dump files according to information in the index list, and
enable the first computing device to access the first slave core dump file through the communication interface, wherein the master core dump file and the first slave core dump file are assembled by the first computing device into an assembled core dump file, and the assembled core dump file is analyzed by the first computing device for debugging the program running in the second computing device,
receive a second request from the first computing device for a second slave core dump file when the assembled core dump file is determined by the first computing device to not contain sufficient information for debugging the program running in the second computing device; and
enable the first computing device to access the second slave core dump file through the communication interface, wherein, the assembled core dump file and information in the second slave core dump file are assembled by the first computing device into an updated assembled core dump file, and the updated assembled core dump file is analyzed by the first computing device for debugging the program running in the second computing device.

16. The second computing device according to claim 15, wherein generating the master core dump file and one or more slave core dump files is triggered by at least one of the following events:
a software-related failure or error in running the program;
a hardware-related failure or error in running the program;
a scheduled checkpoint event;
following an instruction embedded in the program; and
an input or interruption received by the second computing device.

17. The second computing device according to claim 15, wherein the master core dump file further comprises a first item of the dumped data.

18. The second computing device according to claim 17, wherein the first slave core dump file stores a second item of the dumped data which is different from the first item of the dumped data.

19. The second computing device according to claim 15, wherein an entry in the index list corresponding to the first slave core dump file comprises: at least one of an identifier and an address of the first slave core dump file, at least one of an identifier and an address of an item of the dumped data, and a mapping relationship between the first slave core dump file and the item of the dumped data.

20. The second computing device according to claim 19, wherein the request comprises at least one of the identifier and the address of the first slave core dump file.

21. A non-transitory computer readable medium storing program codes for execution by a first computing device to debug a program running in a second computing device, the program codes comprise:
instructions for obtaining a master core dump file generated by the second computing device, wherein the master core dump file comprises an index list, each entry of the index list corresponds to a slave core dump file of one or more slave core dump files generated or to be generated by the second computing device, and wherein each of the one or more slave core dump files includes at least one item of dumped data related to the program;
instructions for selecting a first slave core dump file from the one or more slave core dump files according to information in the index list;
instructions for obtaining the selected first slave core dump file;
instructions for assembling the master core dump file and the first slave core dump file into an assembled core dump file, wherein the assembled core dump file is analyzed by the first computing device for debugging the program running in the second computing device,
instructions for determining, by the first computing device, whether the assembled core dump file contains sufficient information for debugging the program running in the second computing device, and when the assembled core dump file is determined to not contain sufficient information for debugging the program running in the second computing device, selecting, by the first computing device, a second slave core dump file from the one or more slave core dump files according to information in the index list and obtaining the selected second slave core dump file; and
instructions for updating, by the first computing device, the assembled core dump file to include information in the second slave core dump file,
wherein the updated assembled core dump file is analyzed by the first computing device for debugging the program running in the second computing device.

22. A non-transitory computer readable medium storing program codes for execution by a second computing device running a program to be debugged by a first computing device, the program codes comprise:
instructions for generating a master core dump file and one or more slave core dump files, wherein the master core dump file comprises an index list, each entry of the index list corresponds to a slave core dump file of the one or more slave core dump files, and wherein each of the one or more slave core dump files comprises at least one item of dumped data related to the program;
instructions for enabling the first computing device to access the master core dump file;
instructions for receiving a request from the first computing device for a first slave core dump file, wherein the first slave core dump file is selected from the one or more slave core dump files according to information in the index list;
instructions for enabling the first computing device to access the first slave core dump file,
wherein the master core dump file and the first slave core dump file are assembled by the first computing device into an assembled core dump file, and the assembled core dump file is analyzed by the first computing device for debugging the program running in the second computing device, instructions for receiving a second request from the first computing device for a second slave core dump file when the assembled core dump file is determined by the first computing device to not contain sufficient information for debugging the program running in the second computing device; and instructions for enabling the first computing device to access the second slave core dump file, wherein, the assembled core dump file and information in the second slave core dump file are assembled by the first computing device into an updated assembled core dump file, and the updated assembled core dump file is analyzed by the first computing device for debugging the program running in the second computing device.

* * * * *